UNITED STATES PATENT OFFICE.

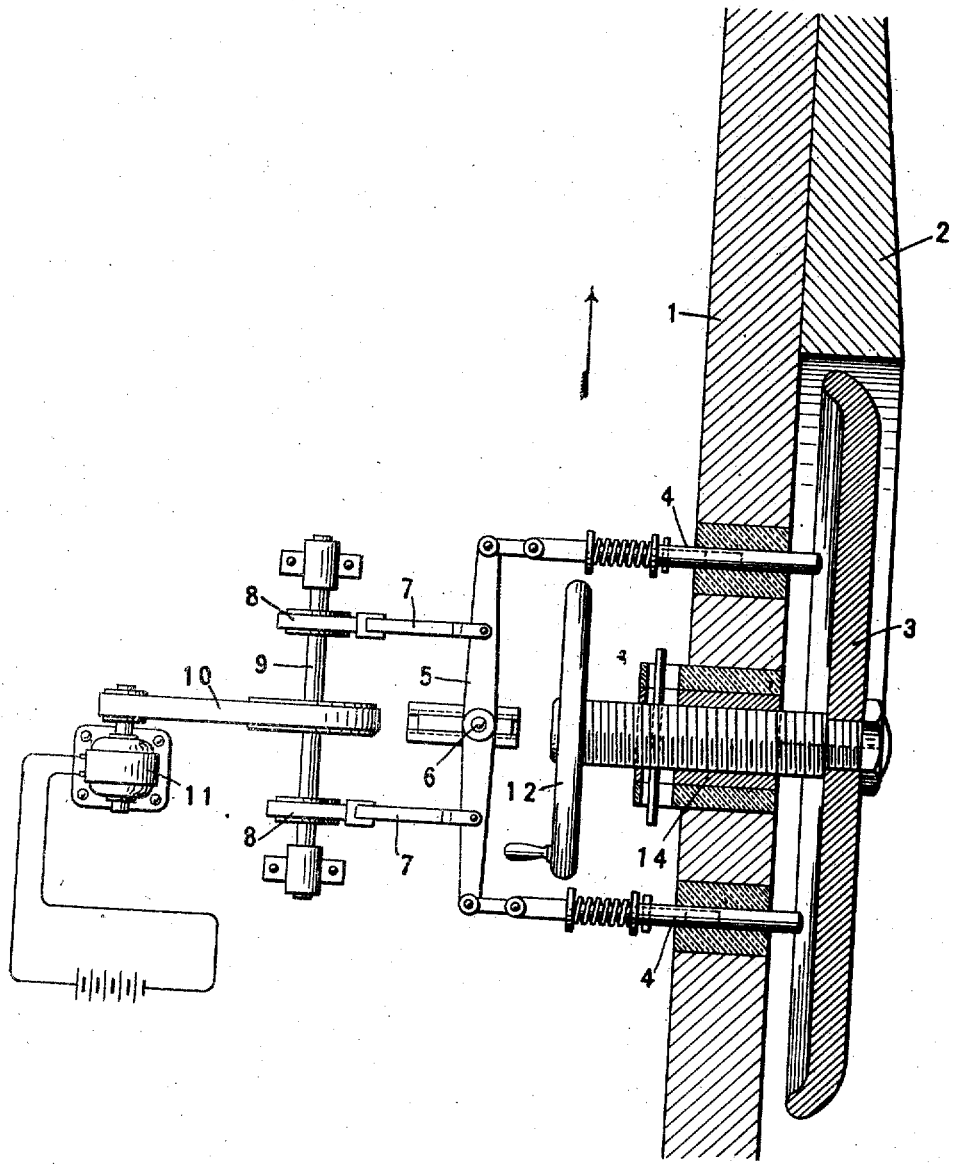

FRANK R. SCHELL, OF NEW YORK, N. Y.

SUBMARINE SIGNAL DEVICE.

955,359.  Specification of Letters Patent.  Patented Apr. 19, 1910.

Application filed March 18, 1909. Serial No. 484,316.

*To all whom it may concern:*

Be it known that I, FRANK R. SCHELL, residing at New York, in the county of New York and State of New York, have invented certain new and useful Improvements in Submarine Signal Devices, of which the following is a specification.

This invention relates to means for producing sound vibrations in water, and more particularly to submarine bells for use on ship-board, to means for operating the same, and to a novel and effective manner of mounting and safeguarding the same upon the outer wall of the ship below the water line. It has been demonstrated that in order to secure the best results with this form of signaling device, and indeed to secure any practical results at all over great distances, a submerged sounding device should have its vibrating body or diaphragm in direct contact with the water. This is in order that the sound waves may be originally produced in the medium by which they are to be transmitted, so that no losses of energy by reflection, &c., may be incurred by the passage of the sound waves from one medium air for instance—into the transmitting medium, water. Where a signaling device of this sort is to be stationary, the inventor or mechanic is not, as a rule, restricted as to the size of the device or to the space it may occupy. He may also provide special means for protecting his apparatus from destruction or injury by floating or submerged objects. It is, however, specially desirable that ships be equipped with submarine bells; and devices which may be entirely operative, and practical for stationary purposes become useless when the attempt is made to attach them to or suspend them from a moving vessel. In the first place, their connections with the vessel are likely to become torn away or seriously injured by contact with passing objects, or, if not thus mechanically affected by such contact, at least suffer interruption and confusion in their delivery of signals. Again, the presence of the sounding device at a proper point on the outside of the vessel may prove a source of inconvenience and annoyance to the handling of the ship; and where the device is merely suspended by a cord or the like, special means must be provided for keeping it submerged and in proper position when the vessel is in motion. On the other hand, if the sounding device be on ship-board, even though below the water line, much of its energy and effectiveness is ordinarily lost in the passage, of the sound waves from the medium of their inception into the water without. To meet these difficulties various expedients have been devised, as for instance providing for the bell a tight chamber, one wall of which is the outer wall of the ship, and filling said chamber with water, the vibrations in this case beginning in the water of the tank, passing through the wall of the ship, and thence into the outside water. This solution of the difficulty is far from perfect, necessitating as it does a considerable and expensive change in the ship construction, and being open to the objection that the vibrations must pass through a medium (the wall of the ship) which is different from the medium of inception and conduction.

The principal object of this invention, therefore, is the special mounting and protection of a submarine sounding device on ship-board, whereby the sound waves may originate in the water outside the ship, by reason of the device being in contact therewith, and yet the device be entirely free of all the inconveniences of a location in the water without the vessel.

A further object is the provision of a novel form of bell for use in this particular art, and especially desirable in connection with the protecting device employed.

Still another object, and working together for good with the other elements characterizing my invention, is a novel bell ringing device.

The elements, combinations, and arrangements of parts constituting the present invention will be hereinafter fully set forth, and the scope of the application thereof defined in the annexed claims.

In the accompanying drawing, which is to be taken as a part of this specification, and in which I have shown a merely preferred form of embodiment of the invention, the figure is a plan view partly in diagram and partly broken away, showing my device as applied to the side of a ship, the normal direction of movement whereof is indicated by the arrow.

Referring to the numerals on the drawings 1 indicates the side wall of a ship or the like floating vessel or object, and 2 indicates a shield member, which tapers gradually in the direction of normal travel of the ship, and which is as wide as the diameter or extent of a bell 3. Although I have shown the shield in the form of a solid tapering member, it should be understood that its only necessary limitations are that it must deflect or tend to deflect obstacles away from the bell which is behind it, and that the distance of its outer surface from the wall of the ship gradually increases aft. In order that the end of shield 2 need not be so thick as to cause the same to offer any appreciable resistance to the onward movement of the vessel, I provide that the bell located aft of it shall be relatively flat, a sort of diaphragm, as it were, lying closely along the wall of the ship, and protected by the shield 2, which deflects from the side of the vessel any object which may be contacted during the forward movement of the ship.

As a form of bell striking device which is particularly adapted for use with the diaphragm bell described, I provide plungers 4, which may have telescoping sections, with interposed compression springs, as shown for the sake of quick rebound, extending through appropriately packed apertures in the side wall of the ship, and reciprocated in any preferred way. For example, the inner ends of the plungers (there being two shown) are connected to a common actuating bar 5, which is centrally pivoted as at 6. Bar 5 is oscillated upon its pivot by means of eccentric rods 7, connected to eccentrics 8 oppositely mounted on shaft 9 in usual manner, the latter being driven by belt and pulley connection with motor 11. The action of the plungers, of which be it understood, one will suffice will be apparent, and it will also be plain that the striking device described has particular merit in connection with the diaphragm bell, being entirely covered by the inwardly turned edge of the latter.

It is desirable at times, in the use of the bell, and for various reasons, to adjust the position of the same to and from the side of the ship. To this end the bell is mounted so that its central supporting stud may be moved inwardly and outwardly through the wall of the ship, said stud being screw-threaded and rotatable, as by means of hand wheel 12, in a threaded aperture in the side of the vessel, sleeve 14 affording a broad bearing for the stud, as shown.

The operation of the device will be apparent, and its advantages have been already sufficiently adverted to. Nor is it deemed necessary to explain how the signals of the bell may be codified and rendered intelligible, all of this being well understood.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention, which as a matter of language, might be said to fall therebetween.

What I claim as new and desire to secure by Letters Patent is:

1. In an apparatus of the kind described, a shield, the distance of whose outer surface from the wall of the ship decreases in the direction of normal travel of the ship, and a diaphragm bell secured flatwise of the outer wall of the ship aft of said shield.

2. In an apparatus of the kind described, a shield, the distance of whose outer surface from the wall of the ship decreases in the direction of normal travel of the ship, a diaphragm bell secured flatwise of the outer wall of the ship aft of said shield, and means for striking the bell upon the inside thereof.

3. In an apparatus of the kind described, a shield, the distance of whose outer surface from the wall of the ship decreases in the direction of normal travel of the ship, a diaphragm bell, and means for striking the bell working through the wall of the ship.

4. In an apparatus of the kind described, a diaphragm bell arranged flatwise of the wall of the ship, and having a supporting stud movable through the wall of the ship.

5. In an apparatus of the kind described, a bell attached to the outside wall of a ship, and a plunger movable through the wall to strike the bell.

6. In an apparatus of the kind described, a diaphragm bell disposed flatwise outside the wall of a ship, and a means operated from the inner side of the wall for striking the bell.

7. In an apparatus of the kind described, a diaphragm bell disposed flatwise outside the wall of a ship, and a means operated from the inner side of the wall for striking the bell, said means including an eccentric.

8. In an apparatus of the kind described, a diaphragm bell movably secured flatwise adjacent the wall of the ship, and means for moving the bell against the said wall.

9. In an apparatus of the kind described, a diaphragm bell movably secured flatwise adjacent the wall of the ship, and means for moving said bell inwardly and outwardly with respect to said wall.

10. In an apparatus of the kind described, a diaphragm bell movably secured flatwise adjacent the wall of the ship, and an endwise movable supporting member arranged in the support of said bell.

11. In an apparatus of the kind described, a diaphragm bell movably secured flatwise adjacent the wall of the ship, an endwise movable supporting member arranged in the support of said bell, and means for moving said member operated from the interior of the ship.

12. In an apparatus of the kind described, a diaphragm bell movably secured flatwise with respect to the outer wall of a ship, and means for holding said bell in spaced relation with respect to said wall adapted to move said bell against said wall and hold it there.

13. In an apparatus of the kind described, a diaphragm bell movably secured flatwise with respect to the outer wall of a ship, a supporting member threaded through the wall of said ship and interposed in the support of said bell, and means for revolving said member whereby said bell may be held spaced from said wall or moved into engagement with it and held there.

14. In a device of the kind described, a diaphragm bell arranged flatwise with respect to the outer wall of the ship, a supporting member threaded through said wall and secured to said bell, means for rotating said member, a plunger extending through said wall and adapted to strike the inside of said bell, and means for operating said plunger.

15. In a device of the kind described, a diaphragm bell arranged flatwise with respect to the outer wall of the ship, a supporting member threaded through said wall and secured to said bell, means for rotating said member, a pair of plungers extending through said wall and adapted to strike the inside of said bell, and means for operating said plungers in alternation.

In testimony whereof I affix my signature in the presence of two witnesses.

FRANK R. SCHELL.

Witnesses:
  C. B. BRADLEY,
  FREDERICK I. ALLEN.